A. M. JOHNSON.
AUTOMATIC GREASE CUP.
APPLICATION FILED SEPT. 19, 1910.

1,161,313.

Patented Nov. 23, 1915.

Fig. 4ª.

WITNESSES:
M. E. Huffird
D. T. Lantz

INVENTOR
Andrew M. Johnson
BY A. L. Teeter
ATTORNEY

UNITED STATES PATENT OFFICE.

ANDREW M. JOHNSON, OF INDIANAPOLIS, INDIANA.

AUTOMATIC GREASE-CUP.

1,161,313.　　　　　Specification of Letters Patent.　　Patented Nov. 23, 1915.

Application filed September 19, 1910. Serial No. 582,596

*To all whom it may concern:*

Be it known that I, ANDREW M. JOHNSON, a citizen of the United States, and residing at Indianapolis, in the county of Marion and State of Indiana, have invented certain new and useful Improvements in Automatic Grease-Cups, of which the following is a specification.

My invention relates to the automatic compression grease-cups or lubricators in which a spring-pressed plunger is adapted to force a heavy or turgid grease or lubricant to mechanical parts to be lubricated.

The objects of my invention are to provide a lubricator so constructed as to provide a constant feed at any adjustment to parts to be lubricated, to provide means whereby the oil or grease chamber may be refilled without the removal of any parts therefrom, or without alteration of adjustment, and the use of certain construction of plunger and packings as will effectively prevent the grease from passing by the plunger, without causing unnecessary friction, and providing means for regulation of feed.

The invention consists of new and novel features and parts combined as shown in the accompanying drawings and as described in the specifications and more particularly pointed out in the claim.

Figure 1:
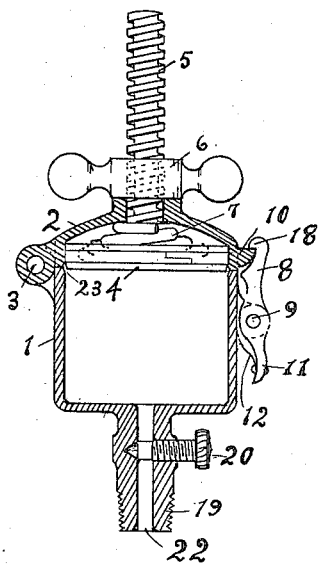
Figure 3:
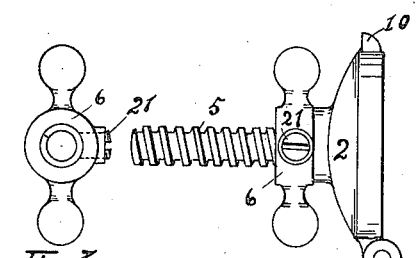
Figure 4:
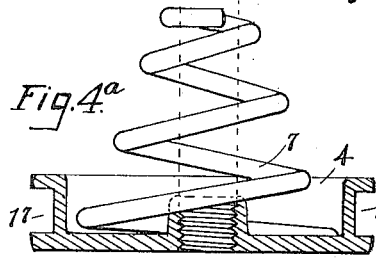
Figure 4:
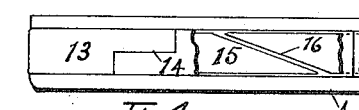
Figure 5:
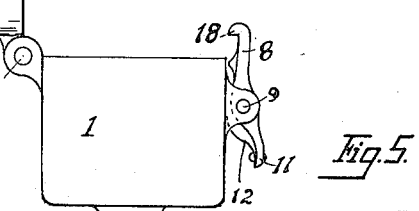
Figure 2:
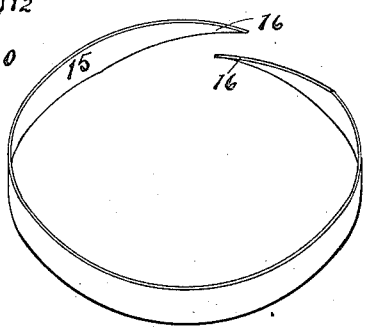

Figure 1 is a partial vertical sectional view of my invention showing the hinged cover and grease reservoir in section and showing the plunger drawn fully into the crown of the cover, the compression spring being fully collapsed and retained in such position by a wing-nut fitted to the threaded stem of plunger, while charging. Fig. 2 is a side elevation of the compression grease-cup with hinged cover thrown open preparatory to refilling the reservoir with lubricant. Fig. 3 is a top view of the said wing-nut, having a compression screw taking on a cushion acting on the threaded stem to prevent it from being jarred out of adjustment. Fig. 4ª shows a view of plunger in section and spring in elevation. Fig. 4 shows edge view of plunger, with packing broken away, and the packing spring. Fig. 5 is a pseudo-perspective view of the plunger packing spring detached.

Referring to the parts of my improvement in detail, as pointed out by numerals, 1 indicates the body, 2 the arched cover hinged to the body at 3, 4 the plunger provided with screw threaded stem 5; to the threaded section of the said stem is fitted a suitable wing nut 6, which is adapted to adjust the distance of movement of the plunger as desired and is provided with a compression screw 21, which takes on a cushion between it and the thread section of said stem whereby the plunger is held or adjusted to any desired distance of movement, 7 the compression spring adapted to force the plunger down upon the grease within the cup, as it is desired to force the lubricant to parts to be lubricated; 8, a latch pivoted at 9, to the side of the body of the grease-cup, provided with a square tooth or hook 18, which is adapted to catch over the projection 10, provided on the cover, when the latter is closed and which is thereby held firmly when the plunger is released and operative; at 11 the opposite end of said latch terminates in a handle or lever end by which it is conveniently operated and is provided with a suitable spring 12, adapted to retain the latch in engagement with the cover at all times.

An annular recess or groove 17 surrounds the plunger 4 in which is placed a strip of firm leather 13, preferably cut as seen at 14 with a lap joint and is of such length as to press firmly into the cup, and to provide further for efficient contact or pressure of the leather strip used as a plunger packing to prevent the grease from passing past the plunger I employ a spring metal strip 15, of suitable length to reach around the smaller circumference within the packing recess 17 in the plunger, and cut at ends at a suitable slant as shown at 16.

At 19 the stem of the cup is preferably screw-threaded to attach to machinery to be lubricated.

At 20 I have provided a pointed screw cutting through the duct 22, so that the discharge through the duct may be readily adjusted to any desired amount.

There are a number of minor changes or alterations that might be resorted to in the use and application of my device without departing from the spirit and scope of my invention and I would have it understood that I hold myself at liberty to make any such alteration and changes as fall fairly within the spirit and scope of the invention and

What I claim as new and desire to secure by Letters Patent is:

The combination with a grease receptacle, of a cover hinged thereto and having a concave or hollowed out inner side and a central opening, a cup-shaped piston formed with an internally-threaded hollow boss projecting centrally from the bottom of said piston, a threaded stem having its lower end secured in said boss, a helical spring of conical form having its upper convolution encircling said stem, and its lower convolution resting on the bottom of said cup-shaped piston around said boss, and means for turning said stem, the said spring being adapted to be compressed within the concave cover and concealed between said cover and said piston.

In testimony whereof I affix my signature in presence of two witnesses.

ANDREW M. JOHNSON.

Witnesses:
C. A. JOHNSON,
L. M. HOWE.

Copies of this patent may be obtained for five cents each, by addressing the "Commissioner of Patents, Washington, D. C."